US005974658A

United States Patent [19]

Hughes

[11] Patent Number: 5,974,658

[45] Date of Patent: Nov. 2, 1999

[54] APPARATUS FOR AND METHOD OF SECURING A HEATING ELEMENT

[75] Inventor: John Thomas Hughes, Stanford Bridge, United Kingdom

[73] Assignee: Ceramaspeed Limited, United Kingdom

[21] Appl. No.: 09/033,488

[22] Filed: Mar. 3, 1998

[30] Foreign Application Priority Data

Mar. 27, 1997 [GB] United Kingdom .................. 9706420

[51] Int. Cl.$^{6}$ .............................. H05B 3/00; B23P 19/00

[52] U.S. Cl. .......................... 29/611; 29/525.01; 29/745; 29/759; 29/760

[58] Field of Search ................................ 29/525.01, 611, 29/745, 759, 760

[56] References Cited

U.S. PATENT DOCUMENTS 5,181,312 1/1993 Gross .
5,834,740 11/1998 Wilde et al. ............................. 29/611

*Primary Examiner*—P. W. Echols
*Attorney, Agent, or Firm*—Ira S. Dorman

[57] ABSTRACT

An elongate electrical resistance heating element of coiled material is secured to a support of insulating material by means of staples driven into the support. A jig is employed having an elongate slot open to a face of the jig for receiving the heating element. A movable elongate base member is provided in and co-operating with the slot, the base member having projections extending in a direction towards the face of the jig, the projections being arranged in predetermined spaced relationship along the base member. Grooves are provided at opposite sides of the slot for receiving staples, bridge members first, into the elongate slot from the face of the jig with the legs of the staples slidably received in the grooves. The grooves are positioned such that the bridge members of the staples are contactable by the projections on the base member. In this way, the heating element can be inserted into the slot in the jig from the face of the jig to contact the base member with the staples and the projections on the base member entering between adjacent turns of the heating element with the staples straddling the material of the heating element. The base member is urged in the slot towards the face of the jig so as to drive the legs of the staples into a support of insulating material in contact with the face of the jig.

17 Claims, 4 Drawing Sheets

APPARATUS FOR AND METHOD OF SECURING A HEATING ELEMENT

This invention concerns an apparatus for, and a method of, securing electric heating element conductors to a base of thermal insulation material, using staples as the fixing means and which are retained by friction in the insulation material.

More particularly the invention concerns an apparatus for, and a method of, securing heating element conductors of coiled material, for example of coiled wire or ribbon form, to a base of thermal insulation material to form a radiant electric heater for location beneath a glass-ceramic plate in a cooking appliance. Such heaters and their application are well known.

DESCRIPTION OF PRIOR ART

Apparatus is known for applying staples to secure heating elements to insulation material.

In one known apparatus, the nozzle of a stapling gun is located between adjacent turns of wire of a coiled wire heating element and a staple is fired into the insulation material so that the staple straddles wire of the element and is gripped in the insulation material by friction forces. The process is repeated at different points along the length of the heating element until the element is adequately secured to the insulation material, the element being shaped to provide a required heat distribution in the resultant heater.

In another known apparatus, as described in EP-A-0 463 334, staples are accurately positioned in a selected pattern on a coiled wire heating element and secured to a base of insulation material in a semi-automatic way. The coiled wire element is located in a groove in a jig and spaced along the groove are holes containing a pair of sprung guidance members through between the ends of which staples are eventually fired. The guidance members converge together to form a V-shape at their tips and, after insertion between adjacent turns of wire of the element, the tips are caused to separate and a staple is fired through the gap to straddle wire of the coiled element and penetrate the insulation material. It is suggested that a large number of staples could be fired at one time to fix the coil in many places.

This apparatus has disadvantages in that the staple can sometimes hit the wire and sometimes the coiled wire element may not be readily removed from the jig without it being pulled and stretched, especially when shaped in a pattern with tight curves.

OBJECT OF THE INVENTION

It is an object of the present invention to provide an apparatus and a method which overcome or ameliorate the above-mentioned disadvantages.

SUMMARY OF THE INVENTION

According to one aspect of the present invention there is provided an apparatus for securing at least one elongate electrical resistance heating element of coiled material to a support of insulating material by means of staples driven into the support, the staples each comprising legs interconnected by a bridge member, the apparatus comprising:

a jig having an elongate slot open to a face of the jig for receiving the at least one heating element;

a movable elongate base member provided in and co-operating with the slot, the base member having projections extending in a direction towards the face of the jig, the projections being arranged in predetermined spaced relationship along the base member;

grooves provided at opposite sides of the slot for receiving staples, bridge members first, into the elongate slot from the face of the jig with the legs of the staples slidably received in the grooves, the grooves being positioned such that the bridge members of the staples are contactable by the projections on the base member, the arrangement being such that at least one heating element can be inserted into the slot in the jig from the face of the jig to contact the base member with the staples and the projections on the base member entering the at least one heating element between adjacent turns thereof with the staples straddling the material of the heating element; and means for urging the base member in the slot towards the face of the jig so as to drive the legs of the staples into a support of insulating material in contact with the face of the jig.

According to another aspect of the present invention there is provided a method of securing at least one elongate electrical resistance heating element of coiled material to a support of insulating material by means of staples driven into the support, the staples each comprising legs interconnected by a bridge member, the method comprising:

providing a jig having an elongate slot open to a face of the jig for receiving the at least one heating element;

providing a movable elongate base member in and co-operating with the slot, the base member having projections extending in a direction towards the face of the jig, the projections being arranged in predetermined spaced relationship along the base member;

inserting staples, bridge members first, into the elongate slot from the face of the jig with the legs of the staples slidably received in grooves provided at opposite sides of the slot in positions such that the bridge members of the staples are contactable by the projections on the base member;

inserting the at least one heating element into the slot in the jig from the face of the jig to contact the base member and such that the staples and the projections on the base member enter the at least one heating element between adjacent turns thereof with the staples straddling the material of the heating element;

locating the support of insulating material in contact with the face of the jig and urging the base member in the slot in the jig towards the support to drive the legs of the staples into the support; and separating the jig and the support, leaving the at least one heating element secured to the support by the staples.

The projections on the base member are preferably of a height such that, when the legs of the staples are driven into the support, the at least one heating element is not disadvantageously pressed against the support by the base member.

The projections on the base member suitably comprise upstanding webs, preferably having a thickness of the same order as the bridge member of a staple.

The slot is suitably provided of a width such that it slidably receives the at least one heating element with sufficient clearance to prevent jamming.

The slot is suitably provided in a shape corresponding to that shape required for the at least one heating element when stapled to the support.

When the staples are narrower than the width of the slot, the slot may be provided with necked regions having provided therein the grooves for slidably receiving the legs of the staples.

A strip-form cassette of temporarily interconnected staples may be provided for transferring staples into the grooves in the jig.

The support preferably comprises compacted microporous thermal insulation material.

The invention is now described by way of example with reference to the accompanying drawings in which:

DESCRIPTION OF PREFERRED EMBODIMENTS

Figure 1:
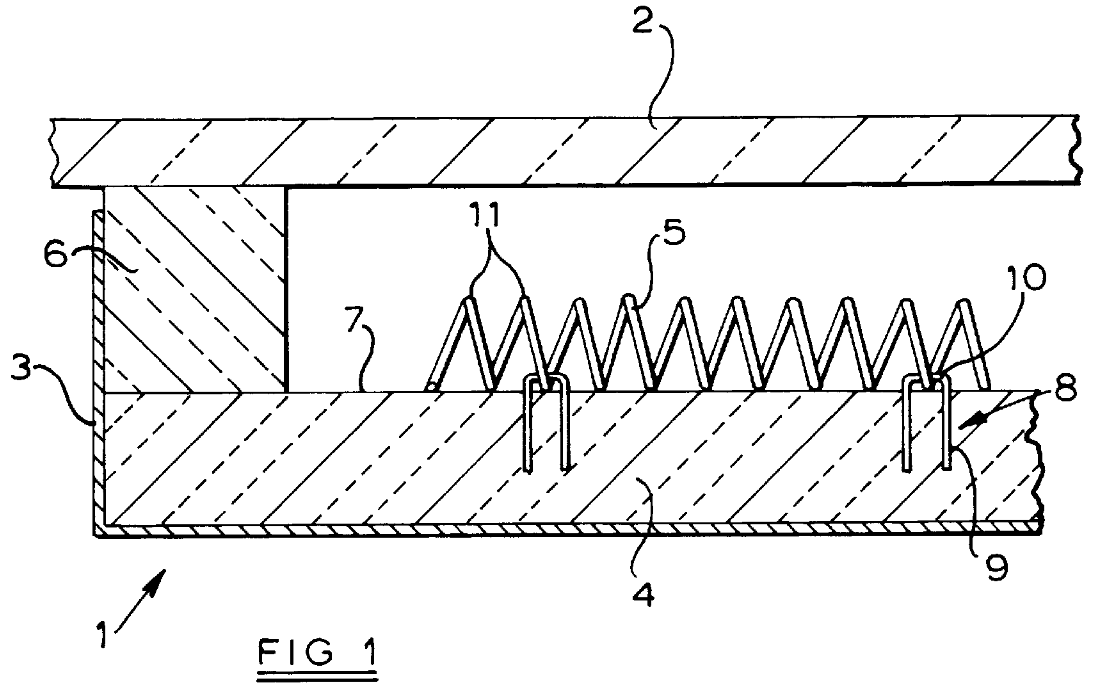
FIG. 1 is a part-sectional view of a radiant heater with a heating element secured by means of staples.

FIG. 1 shows a radiant electric heater 1 positioned beneath a glass-ceramic cooking plate 2. The heater comprises a metal dish 3 having therein a layer 4 of compacted microporous thermal and electrical insulation material, of well known form, serving as a support for an elongate coiled wire or ribbon heating element 5. A peripheral wall 6 of thermal insulation material, also well known in the art, is provided in the heater and contacts the underside of the glass-ceramic top 2.

Figure 2:
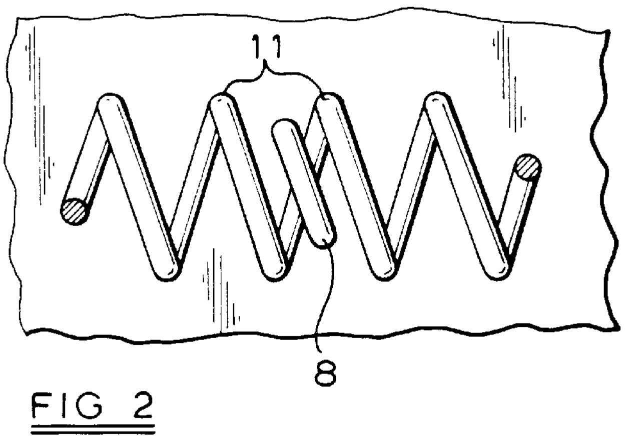
FIG. 2 is a plan view of part of FIG. 1.

In order to secure the heating element 5 to a surface 7 of the support 4, metal staples 8 of known form, each comprising legs 9 interconnected by a bridge member 10, are driven into the support at intervals between turns 11 of the coiled heating element 5. The staples 8 straddle the wire or ribbon of the heating element 5 as particularly shown in FIG. 2.

The elongate heating element 5 is arranged in any desired shape or pattern on the surface of the support 4 and may be located in groove-like depressions (not shown) in the surface of the support 4.

The heating element 5 is secured to the surface 7 of the support 4 with the staples 8 by means of the apparatus of the invention, as follows.

Figure 3:
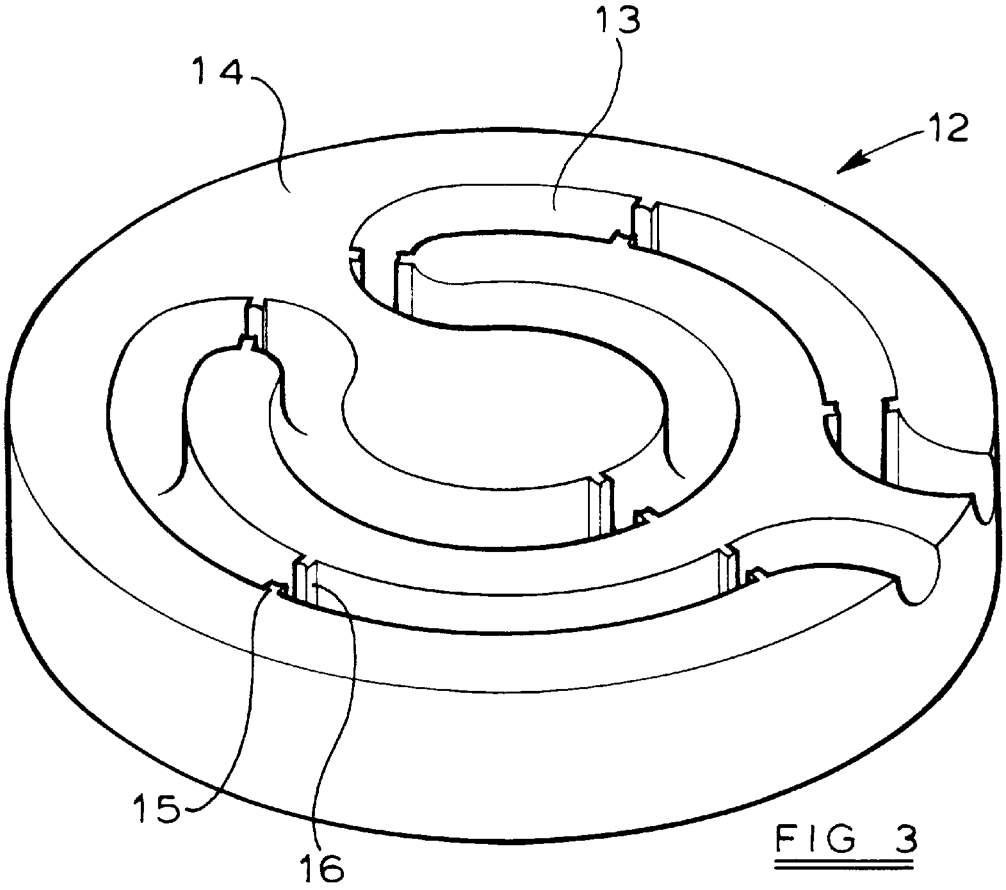
FIG. 3 is a perspective view of a jig for receiving heating element and staples in the apparatus of the invention.

Referring to FIG. 3, a jig 12, constructed for example of metal, has an elongate slot 13 provided through it and open to a face 14 of the jig. The slot 13 is arranged to receive an elongate heating element of coiled wire or ribbon form, such an element being as shown by reference numeral 11 in FIGS. 1 and 2. The elongate slot 13 is arranged in a shape or pattern corresponding to that which is ultimately required for the heating element 5 when secured to the insulating support 4 in FIG. 1. As shown in detail in FIG. 5, the slot 13 is provided on its side walls at spaced apart intervals with facing protruding neck portions 15 having grooves 16 therein in which staples 8 may be slidably received.

Figure 4:
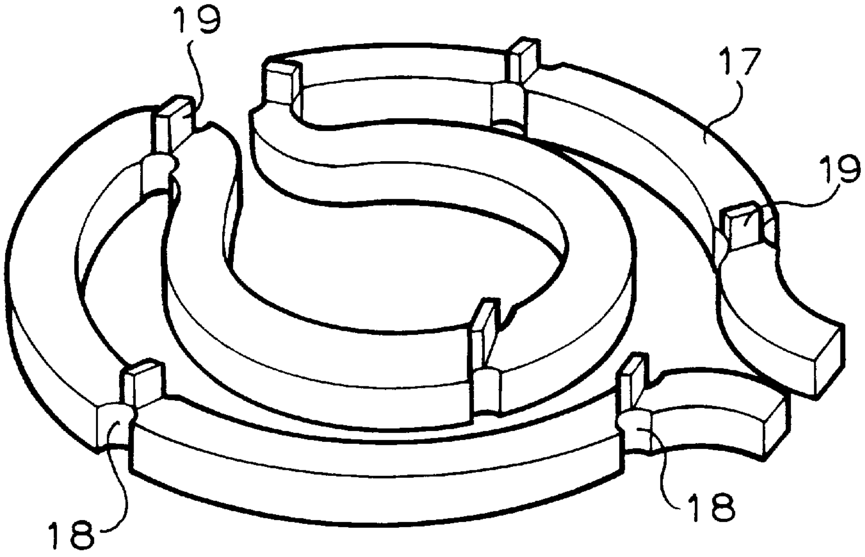
FIG. 4 is a perspective view of a movable elongate base member for use in co-operation with the jig of FIG. 3.

A movable elongate base member 17 is provided as shown in FIG. 4. Such base member 17, suitably formed of metal, is arranged in and co-operating with the slot 13 of the jig 12 and adapted to be urged in the slot outwardly towards the face 14 of the jig 13. The base member 17 is provided with indented regions 18 to provide necessary clearance with the neck portions 15 on the side walls of the slot 13. Projections 19 are provided as upstanding webs on the base member 17 at the indented regions and are arranged to make contact with the bridge members 10 of the staples 8 when the latter are inserted into the grooves 16.

Figure 8:
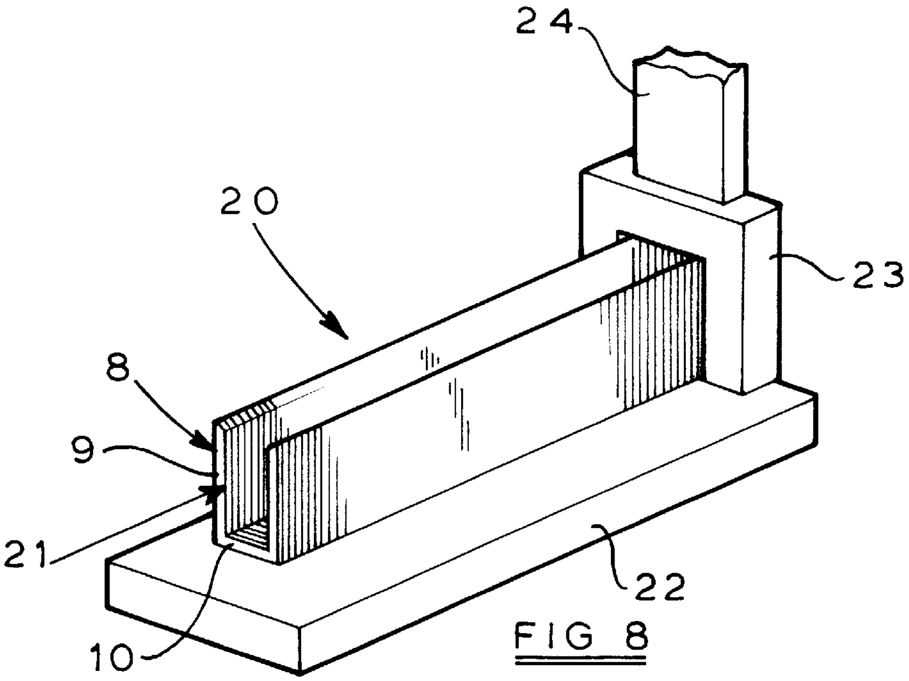
FIG. 8 is a perspective view of a staple cassette arrangement for use in the apparatus of the invention.
Figure 9:
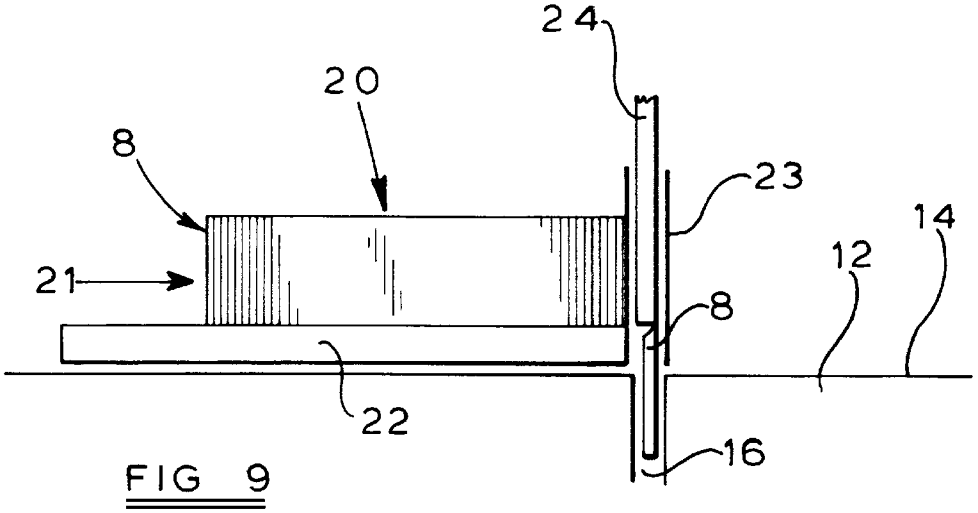
FIG. 9 is a side, part-sectional, view of the cassette of FIG. 8 applied to the jig and base member assembly of FIGS. 3 and 4.

The staples 8 are inserted, bridge members 10 first, into the grooves 16 in the neck portions 15 on the side walls of the slot 13. Insertion of the staples may be effected automatically or semi-automatically using a cassette arrangement as shown in FIGS. 8 and 9. A cassette 20 of temporarily adhered together staples 8 is fed by spring action 21 along a support base 22 into a feeder 23 from which the staples are ejected one at a time, bridge member 10 first, into the grooves 16 in the neck portions 15 on the side walls of the slot 13. Such ejection from the feeder 23 is effected by operation of a slider plate 24.

Figure 5:
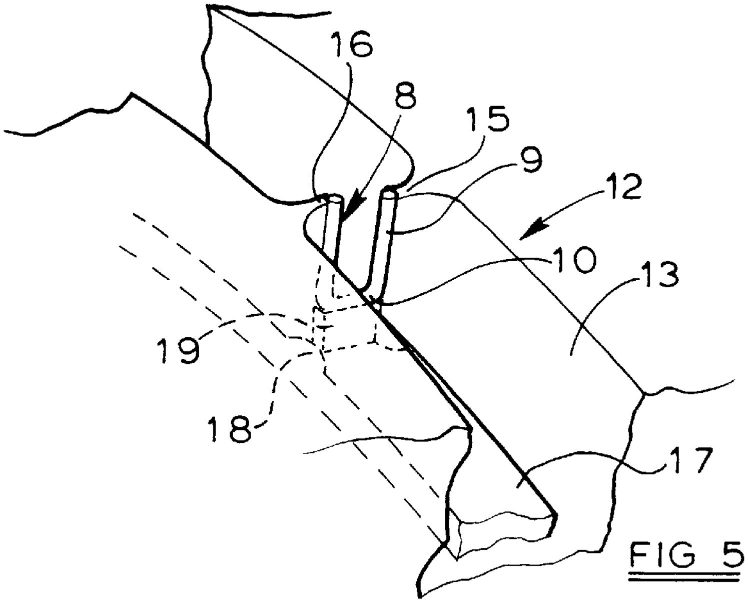
FIG. 5 is a detailed view of part of the jig of FIG. 3 assembled with the base member of FIG. 4 and with a staple slidably received therein.
Figure 6:
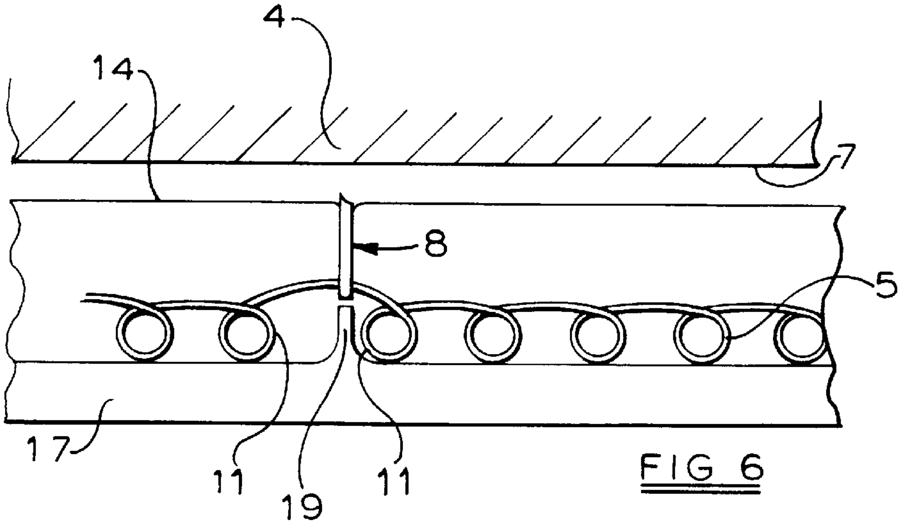
FIG. 6 is a cross-sectional view of the jig and base member assembly of FIGS. 3 to 5, with a staple slidably received therein and also a coiled wire or ribbon heating element, and arranged against an insulating support.
Figure 7:
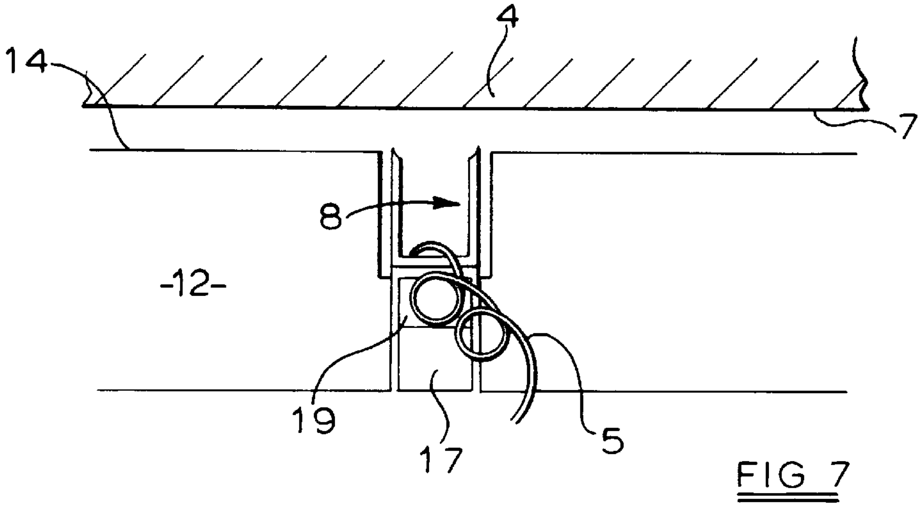
FIG. 7 is a cross-sectional view perpendicular to that of FIG. 6.

With the staples 8 slidably located in the jig 12 as shown in FIG. 5, the coiled wire or ribbon heating element 5 is inserted into the slot 13 in the jig 12 from the face 14 of the jig, to contact the base member 17 and such that the staples 8 and the projections 19 on the base member 17 enter the heating element 5 between adjacent turns 11 of coiled wire or ribbon and with the staples 8 straddling the wire or ribbon of the heating element, as shown in FIGS. 6 and 7.

The jig 12 is then located with its face 14 in contact with the surface 7 of a support 4 of compacted microporous thermal insulation material. As shown in FIG. 1, such support 4 may be provided in a metal dish 3. The base member 17 is then urged in the slot 13 in the jig 12 towards the support 4, to cause the legs of all of the staples 8 to be driven simultaneously into the support 4 by pressure on the bridge members 10 thereof by the projections 19 on the base member 17. At the same time, the heating element 5 is ejected outwardly from the slot 13 by the base member 17.

When the jig 12 and the support 4 are then separated, the heating element 5 remains secured to the support 4 by means of the staples 8, as shown in FIG. 1.

The surface 7 of the support 4 may have been previously provided with appropriate groove-like depressions (not shown) into which the heating element 5 locates.

By means of the apparatus of the invention, all of the securing staples for the heating element can readily be simultaneously driven into the insulating support of a heater and localised jamming of the heating element in the jig is prevented as a result of the uniform ejection of the element from the jig by the advancing base member.

The projections 19 on the base member 17 are preferably of a height such that, when the legs 9 of the staples 8 are driven into the support 4, the heating element 5 is not disadvantageously pressed against the support 4 by the base member 17 to the extent that the element or the support is deformed or damaged.

The projections 19, in the form of webs on the base member 17, preferably have a thickness of the same order as the bridge members of the staples.

I claim:

1. An apparatus for securing at least one elongate electrical resistance heating element of coiled material to a support of insulating material by means of staples driven into the support, the staples each comprising legs interconnected by a bridge member, the apparatus comprising:

a jig having an elongate slot open to a face of the jig for receiving the at least one heating element;

a movable elongate base member provided in and co-operating with the slot, the base member having projections extending in a direction towards the face of the jig, the projections being arranged in predetermined spaced relationship along the base member;

grooves provided at opposite sides of the slot for receiving staples, bridge members first, into the elongate slot from the face of the jig with the legs of the staples slidably received in the grooves, the grooves being positioned such that the bridge members of the staples are contactable by the projections on the base member, the arrangement being such that at least one heating element can be inserted into the slot in the jig from the face of the jig to contact the base member with the staples and the projections on the base member entering the at least one heating element between adjacent turns thereof with the staples straddling the material of the heating element; and means for urging the base member in the slot towards the face of the jig so as to drive the legs of the staples into a support of insulating material in contact with the face of the jig.

2. An apparatus according to claim 1, wherein the projections on the base member are of a height such that, when the legs of the staples are driven into the support, the at least one heating element is not disadvantageously pressed against the support by the base member.

3. An apparatus according to claim 1, wherein the projections on the base member comprise upstanding webs.

4. An apparatus according to claim 3, wherein the webs have a thickness of the same order as the bridge member of a staple.

5. An apparatus according to claim 1, wherein the slot is provided of a width such that it slidably receives the at least one heating element with sufficient clearance to prevent jamming.

6. An apparatus according to claim 1, wherein the slot is provided in a shape corresponding to that shape required for the at least one heating element when stapled to the support.

7. An apparatus according to claim 1, wherein the staples are narrower than the width of the slot, and wherein the slot is provided with necked regions having provided therein the grooves for slidably receiving the legs of the staples.

8. An apparatus according to claim 1, wherein a strip-form cassette of temporarily interconnected staples is provided for transferring staples into the grooves in the jig.

9. A method of securing at least one elongate electrical resistance heating element of coiled material to a support of insulating material by means of staples driven into the support, the staples each comprising legs interconnected by a bridge member, the method comprising:

providing a jig having an elongate slot open to a face of the jig for receiving the at least one heating element;

providing a movable elongate base member in and co-operating with the slot, the base member having projections extending in a direction towards the face of the jig, the projections being arranged in predetermined spaced relationship along the base member;

inserting staples, bridge members first, into the elongate slot from the face of the jig with the legs of the staples slidably received in grooves provided at opposite sides of the slot in positions such that the bridge members of the staples are contactable by the projections on the base member;

inserting the at least one heating element into the slot in the jig from the face of the jig to contact the base member and such that the staples and the projections on the base member enter the at least one heating element between adjacent turns thereof with the staples straddling the material of the heating element;

locating the support of insulating material in contact with the face of the jig and urging the base member in the slot in the jig towards the support to drive the legs of the staples into the support; and separating the jig and the support, leaving the at least one heating element secured to the support by the staples.

10. A method according to claim 9, in which the projections on the base member are of a height such that, when the legs of the staples are driven into the support, the at least one heating element is not disadvantageously pressed against the support by the base member.

11. A method according to claim 9, in which the projections on the base member comprise upstanding webs.

12. A method according to claim 11, in which the webs have a thickness of the same order as the bridge member of a staple.

13. A method according to claim 9, in which the slot is provided of a width such that it slidably receives the at least one heating element with sufficient clearance to prevent jamming.

14. A method according to claim 9, in which the slot is provided in a shape corresponding to that shape required for the at least one heating element when stapled to the support.

15. A method according to claim 9, in which the staples are narrower than the width of the slot, and in which the slot is provided with necked regions having provided therein the grooves for slidably receiving the legs of the staples.

16. A method according to claim 9, in which the staples are inserted into the grooves in the jig by transfer from a strip-form cassette of temporarily interconnected staples.

17. A method according to claim 9, in which the support comprises compacted microporous thermal insulation material.

* * * * *